Figure 1:
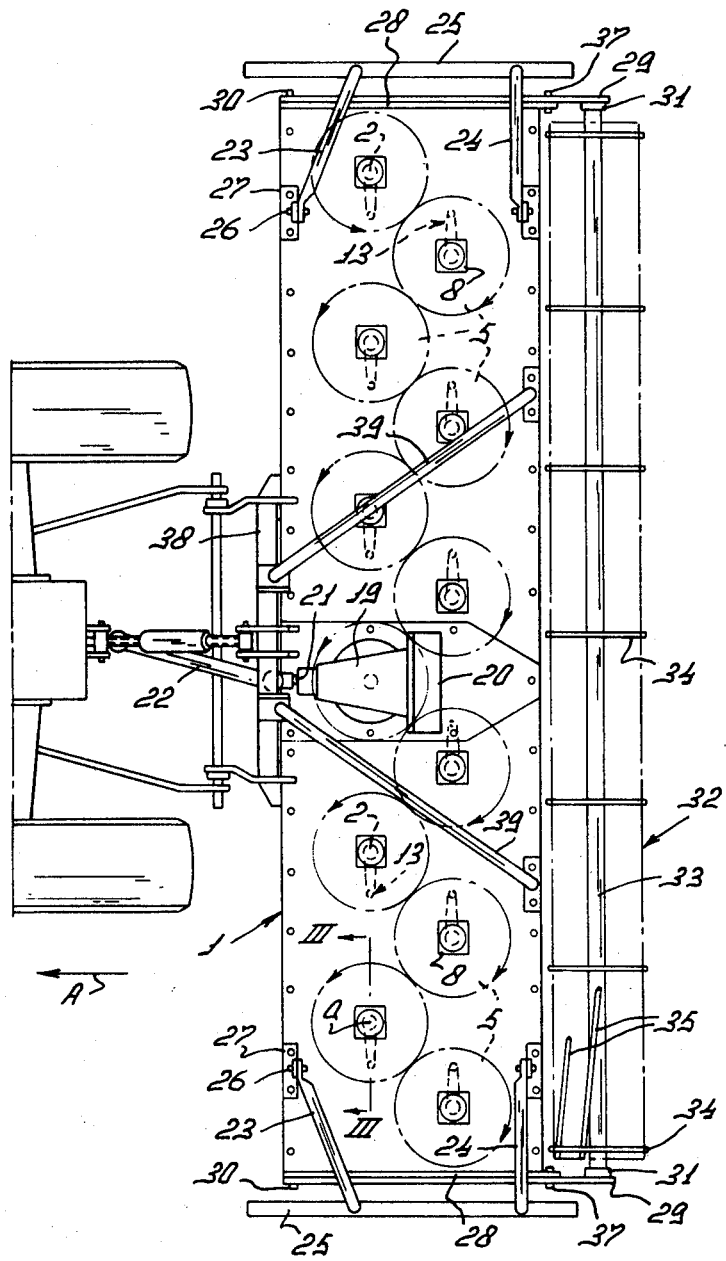

United States Patent [19]

van der Lely

[11] 4,077,476

[45] Mar. 7, 1978

[54] SOIL CULTIVATING IMPLEMENTS

[76] Inventor: Cornelis van der Lely, 7 Bruschenrain, Zug, Switzerland

[21] Appl. No.: 663,440

[22] Filed: Mar. 3, 1976

[30] Foreign Application Priority Data

Mar. 6, 1975 Netherlands .................... 7502633

[51] Int. Cl.² ............... A01B 33/06; A01B 33/12
[52] U.S. Cl. .............................. 172/49; 172/56;
172/59; 172/68; 172/713
[58] Field of Search ............. 172/56, 59, 68, 49, 172/713

[56] References Cited

U.S. PATENT DOCUMENTS

| 30,871 | 12/1860 | Crofoot | 172/59 X |
|---|---|---|---|
| D. 237,527 | 11/1975 | van der Lely | 172/713 X |
| 605,631 | 6/1898 | Dallmann | 172/56 X |
| 1,149,126 | 8/1915 | Gerhard | 172/56 |
| 2,489,204 | 11/1949 | Sprick et al. | 172/59 X |
| 3,810,434 | 5/1974 | van der Lely et al. | 172/59 X |
| 3,821,989 | 7/1974 | van der Lely et al. | 172/59 |
| 3,943,999 | 3/1976 | van der Lely et al. | 172/59 |

FOREIGN PATENT DOCUMENTS

| 2,264,296 | 7/1973 | Germany | 172/59 |
|---|---|---|---|
| 2,401,637 | 7/1974 | Germany | 172/59 |

Primary Examiner—Paul E. Shapiro
Attorney, Agent, or Firm—Mason, Mason & Albright

[57] ABSTRACT

A cultivating implement has an elongated frame portion and soil working members journalled in the frame portion to rotate about upwardly extending axes. Each soil working member has a single downwardly extending tine that is spaced from a shaft that defines the corresponding axis of rotation. The upper ends of the shafts of the members are secured to pinion gears and the gears of neighboring shafts are meshed with one another so that a power take off connection to a central pinion drives all of the pinions and adjacent soil working members rotate in relatively opposite directions. The members are staggered in two straight transverse rows so that their axes of rotation are arranged at the corners of an imaginary zig-zag line when the implement is viewed in plan and the members of a leading row are rotated in common in a direction opposite from those members of a rear row. The tines of the members in each row are preferably orientated in the same direction. A supporting open roller is adjustably interconnected to the frame to regulate the working depths of the tines.

12 Claims, 4 Drawing Figures

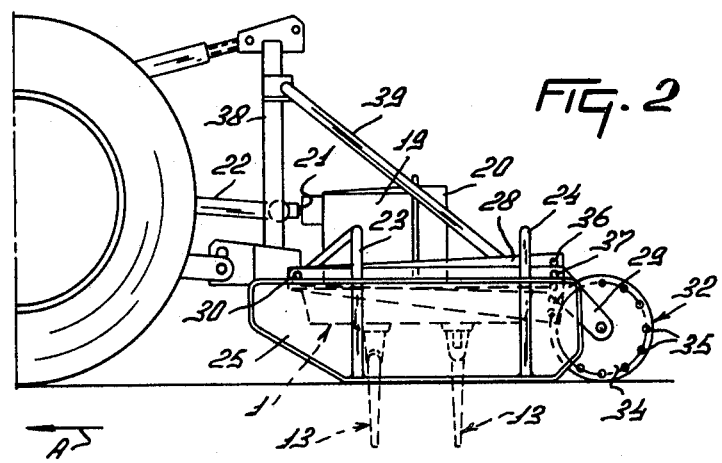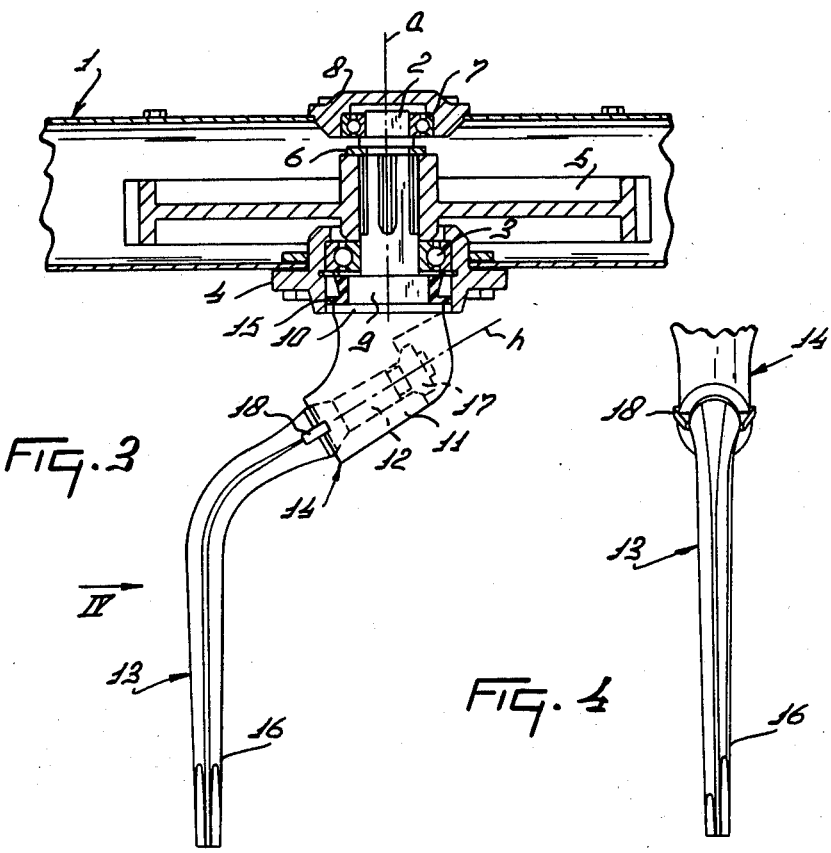

SOIL CULTIVATING IMPLEMENTS

For a better understanding of the invention, and to show how the same may be carried into effect, reference will now be made, by way of example, to the accompanying drawings, in which:

FIG. 1 is a plan view of a rotary harrow in accordance with the invention connected to the rear of an agricultural tractor, FIG. 2 is a side elevation as seen in the direction indicated by an arrow II in FIG. 1, FIG. 3 is a section, to an enlarged scale, taken on the line III—III in FIG. 1, and FIG. 4 is a view as seen in the direction indicated by an arrow IV in FIG. 3.

Referring to the accompanying drawings, the soil cultivating implement which is illustrated is in the form of a rotary harrow that has a hollow box-shaped frame portion 1 which extends substantially horizontally transverse, and normally substantially horizontally perpendicular, to the intended direction of operative travel of the harrow that is indicated in FIGS. 1 and 2 of the drawings by an arrow A. A plurality (of which there are twelve in the illustrated example) of upwardly extending and normally vertical or substantially vertical shafts 2 are rotatably mounted in the frame portion 1 in a manner which will be described in detail below, there being two straight rows of the shafts 2 that both extend substantially horizontally parallel to the transverse length of the frame portion 1, the two straight rows each comprising the same number of the shafts 2 (i.e. six shafts per row in the illustrated example.) It can be seen from FIG. 1 of the drawings that one row of the shafts 2 is further advanced in the direction A than is the other row and that, when the harrow is viewed from the rear in the direction A, the shafts 2 of one row lie midway between the shafts 2 of the other row. Thus, the two straight rows are arranged one behind the other with their shafts 2 in relatively staggered positions, an imaginary zig-zag line that (as seen in FIG. 1 of the drawings) interconnects the successive shafts 2 of one straight row and those of the other straight row having its limbs alternately oppositely inclined to the direction A at substantially 45°. The distance between each shaft 2 and its immediate neighbour or neighbours in both the leading straight row and the rear straight row, with respect to the direction A, is preferably substantially 50 cms. and, similarly, the distances between the various shafts 2 in the leading row and the immediately neighbouring shaft or shafts in the rear row are all the same. In the example which is being described, 12 substantially vertical planes that all extend parallel to the direction A and each of which contains the longitudinal axis of a corresponding one of the twelve shafts 2 are spaced apart from one another by distances which preferably have magnitudes of substantially 25 cms. Moreover, a substantially vertical plane that contains the longitudinal axes of all six shafts of the leading row is spaced from a parallel substantially vertical plane that contains the longitudinal axes of all six shafts of the rear row by a distance, which, once again, it is preferred should have a magnitude of substantially 25 cms.

Each shaft 2 is rotatably supported by a corresponding lower ball bearing 3 (FIG. 3), said ball bearing being arranged in its own bearing housing 4 which latter is detachably secured to a lower wall of the frame portion 1 by small bolts that can be seen in FIG. 3 of the drawings. Each shaft 2 is splined inside the hollow frame portion 1 and the splined portion thereof carries the matchingly splined hub of a corresponding straight- or spur-toothed pinion 5. The lower end of the hub of each pinion 5 bears against the inner race of the corresponding lower ball bearing 3 and its upper end bears against the lower surface of a circlip 6 whose inner edge is lodged in a groove in the shaft 2 concerned immediately above the splines thereof. All twelve of the toothed pinions 5 have the same diameter and that diameter is such that, as can be seen in outline in FIG. 1 of the drawings, the teeth of each pinion 5 are in mesh with those of its immediate neighbour, or both of its immediate neighbours, in the other row of pinions 5 that corresponds to the other leading or rear row of shafts 2. The upper end of each shaft 2 is rotatably supported by a corresponding upper ball bearing 7 that is located in its own bearing housing 8 which, like the lower bearing housings 4, is releasably secured to a wall (in this case the upper wall) of the frame portion 1. The upper wall of the frame portion 1 is, in fact, constituted by at least one cover plate whose leading and rear edges are secured to corresponding rims of a generally channel-shaped lower plate of the portion 1 by small bolts that are illustrated in outline in FIG. 1 of the drawings with the heads of two of those bolts also being visible in FIG. 3.

Each shaft 2 projects from beneath the lower wall of the frame portion 1 and, at the level of that wall, is formed with a shoulder 9, said shoulder 9 being located immediately beneath the level of the corresponding lower ball bearing 3. The shoulder 9 is of larger diameter that is the portion of the shaft 2 that is contained within the frame portion 1 and, beneath the shoulder 9, an even larger diameter land 10 is formed, said land 10 having a flat upper surface and being arranged substantially to close the downwardly directed mouth of the corresponding lower bearing housing 4. The bottom of each land 10 is integrally connected to a downwardly narrowing part of a corresponding tine holder 11, said downwardly narrowing part being of substantially oval cross-section. Each tine holder 11 is formed with a bore to receive a fastening portion 12 of a corresponding rigid soil working tine 13. Each shaft 2 and the corresponding integral holder 11 constitutes, together with the tine 13 that is detachably connected to that holder, a soil working or cultivating member 14. A sealing ring 15 surrounds each shoulder 9, immediately above the corresponding land 10, and acts substantially to prevent ingress of dirt and the like to the corresponding bearing 3 and to the interior of the frame portion 1. A substantially vertical axis of rotation $a$, that is also the longitudinal axis of the corresponding shaft 2, is defined by each pair of lower and upper ball bearings 3 and 7 and each axis of rotation $a$ non-perpendicularly intersects the longitudinal axis $h$ of the corresponding straight tine fastening portion 12.

Each straight tine fastening portion 12 merges integrally into a corresponding straight active or soil working portion 16 part of which extends parallel or substantially parallel to the corresponding axis of rotation $a$. The fastening portion 12 of each tine 13 first comprises, considered in a direction away from its integral junction with the corresponding active or soil working portion 16, a quite steeply tapering part which is followed, in the same direction, by a very gently tapering part that has substantially three times the axial length of the quite steeply tapering part. Both these parts abut against matchingly shaped parts of the internal bore of the tine holder 11 that receives the fastening portion 12. Each fastening portion 12 terminates at its free end in a screwthreaded part that projects from the upper end of the bore through the corresponding tine holder 11 and which is arranged to receive a corresponding frusto-conically faced fastening nut 17. The frusto-conical face of the nut 17 co-operates with a matchingly tapered face at the mouth of the bore and, when one of the tines 13 has been installed in its operative position and the corresponding nut 17 has been tightened to the required extent, the tine 13 is most firmly, but nevertheless releasably, retained in connection with the co-operating holder 11. It will be noted from FIG. 3 of the drawings that the projecting end of the screwthreaded part of each fastening portion 12, and the corresponding nut 17, are located in a protective recess or pocket that is formed at the upper end of the corresponding bore and that acts to shield the protected parts from being struck by stones and other potentially damaging hard obstacles during the use of the rotary harrow. A bend in each tine 13 forms a part of the active or soil working portion 16 thereof together with a short straight portion that is located above the bend in rectilinear alignment with the corresponding fastening portion 12. At the integral junction between each fastening portion 12 and the corresponding active or soil working portion 16, two substantially diametrically opposed lugs 18 are provided and those lugs are entered in notches or recesses formed in the material of the corresponding tine holder 11 around the mouth at the lowermost end of the bore therethrough. When the nuts 17 have been tightened with the lugs 18 correctly engaged in the notches or recesses, the tines 13 are retained against being turned angularly about the axes $h$ of their fastening portions 12 to any significant extent.

The active or soil working portion 16 of each tine 13 commences, at the level of the lugs 18, with a substantially rectangular cross-section but, moving downwardly along said portion 16 through the corresponding bend and towards the lowermost free end or tip of that portion, said portion 16 tapers very gently and its cross-section is slowly but progressively flattened until, near the lowermost free end or tip, diagonals taken between the opposite corners of the substantially rectangular cross-section have a length ratio of substantially 1:2. The longer of the two diagonals extends substantially tangentially with respect to a circle centred upon the corresponding axis of rotation $a$ while, consequently, the shorter diagonal is more or less radially disposed with respect to that axis of rotation. The cross-section is not, in fact, truly rectangular because the corners thereof that are furthest apart are flattened and the corners thereof that are closer together are rounded to some extent, these effects becoming progressively more pronounced towards the lowermost free end or tip of each tine portion 16. It can also be seen in FIGS. 3 and 4 of the drawings that, in a lowermost free end or tip region of each tine portion 16, the what would otherwise be flat sides between the corners of that substantially rectangular cross-section portion are hollowed out to form recesses or grooves that extend upwardly for some distance from each lowermost extremity. The recesses or grooves that are at the front of the tine with respect to the intended direction of rotation of the corresponding member 14 (see the small arrows in FIG. 1 of the drawings) extend further lengthwise along each tine portion 16 than do those that are at the rear with respect to the same direction. The right-hand side of FIG. 4 is at the front with respect to the intended direction of operative rotation of the corresponding member 4 and the left-hand side thereof is at the rear with respect to that direction.

One of the shafts 2 of the leading row thereof that is located substantially centrally across the width of the rotary harrow has an upward extension through the top of the hollow frame portion 1 into a gear box 19 which is mounted on top of the frame portion 1. The shaft extension is provided, inside the gear box 19, with a bevel pinion whose teeth mesh with those of a further bevel pinion carried by a substantially horizontal shaft (not visible) that is parallel to the direction A. The splined rearmost end of the substantially horizontal shaft that has just been mentioned, and that of a further overlying and parallel shaft 21 project through a rear wall of the gear box 19 into a change-speed gear 20. The transmission ratio between the shaft 21 and the underlying substantially horizontal shaft in the gear box 19 can be brought to a desired value by employing an appropriate pair of exchangeable and interchangeable pinions on the splined ends of the two shafts inside the change-speed gear 20. The shaft 21 constitutes a rotary input shaft of the gear box 19 and, by an appropriate use of the change-speed gear 20, the speed of rotation of the shafts 2 can be increased, or decreased, as may be required without having to alter the speed at which the rotary input shaft 21 is driven. In the use of the rotary harrow, the splined or otherwise keyed forwardly projecting end of the shaft 21 is placed in driven connection with the power take-off shaft of an operating agricultural tractor or other vehicle by way of an intermediate telescopic transmission shaft 22, which is of a construction that is known per se, having universal joints at its opposite ends.

Two shield plates 25 that are normally vertically or substantially vertically disposed during the operation of the rotary harrow are arranged beyond the opposite ends of the two rows of shafts 2 and soil working or cultivating members 14 in substantially parallel relationship with the direction A. Each shield plate 25 has perpendicularly bent-over edges, lower regions of which are arranged to co-operate slidably with the ground surface during the use of the harrow and, to enable said plates 25 to match undulations in the surface of the soil which they may encounter during operative progress in the direction A, said plates 25 are pivotable upwardly and downwardly about corresponding substantially horizontal axes that are both substantially parallel to the direction A. To this end, each plate 25 is connected by a corresponding pair of arms 23 and 24 to brackets 27 that are mounted on the upper wall of the frame portion 1 at the front and rear edges of that wall. Horizontally aligned pivot pins 26 effect the pivotal connections between the arms 23 and 24 and the brackets 27 and afford the substantially horizontal pivotal axes that have been referred to above. It can be seen from both FIGS. 1 and 2 of the drawings that each shield plate 25 has a length in the direction A which is significantly greater than the fore and aft dimension of the frame portion 1, said plates 25 projecting beyond the frame portion 1 at both the front and the rear thereof relative to said direction A. It will be noted that the leading arm 23, with respect to the direction A, by which the plates 25 are linked to the leading brackets 27, are inclined forwardly towards the brackets 27 in convergent relationship as seen in the plan view of FIG.

1. Also as seen in FIG. 1 of the drawings, the two pivotal axes that are afforded by the pivot pins 26 and that correspond to the two shield plates 25 are located substantially midway between the axes of rotation a of the two shafts 2 and members 14 that are located at the corresponding ends of the leading and rear rows of said shafts 2.

The opposite ends of the hollow frame portion 1 are closed by parts which include substantially sector-shaped plates 28, arms 29 being turnable upwardly and downwardly alongside said plates 28 about a substantially horizontal axis that is afforded by strong aligned pivot pins 30 which are located at the top and front of the frame portion 1 with respect to the direction A. The arms 29 project rearwardly of the frame portion 1 beyond the rearmost edges of the sector-shaped plates 28 and are there directed obliquely downwardly. A rotatable supporting member in the form of an open ground roller 32 is carried by substantially horizontally aligned bearings 31 between the rearmost extremities of the arms 29 and extends substantially horizontally perpendicular to the direction A throughout substantially the whole of the working width of the members 14 and behind both rows of those members, again with respect to the direction A. The ground roller 32 comprises a central tubular support 33 at regular intervals along which a plurality, such as seven, of support plates 34 are arranged so as to extend parallel to one another and to the direction A. The substantially vertical support plates 34 are formed, around their peripheries, with regularly spaced apart holes through which elongate elements 35 are entered so as to extend generally parallel to the longitudinal axis of the central support 33 or so as to be wound helically around that axis to some extent as shown in FIG. 1 of the drawings in respect of the example that is being described. Each support plate 34 is preferably of circular shape, each elongate element 35 is preferably of circular cross-section and of tubular or solid rod-shaped formation and the number of elements 35 that is provided around the central support 33 may conveniently be 12. The holes in the plates 34 through which the elements 35 are entered are preferably of larger diameter than are the elements 35 themselves so that said elements can turn in those holes to some extent but small transverse pins or the like (not shown) are entered through the elements 35, alongside some of the plates 34, to prevent axial movements of the elements 35 relative to the plates 34 to any significant extent.

The curved rearmost edge of each sector-shaped plate 28 is formed with a corresponding curved row of holes 36 that are all equidistant from the axis defined by the strong pivot pins 30. The two arms 29 are formed with single holes at the same distance from said axis and locking pins or, preferably, bolts 37 can be entered through the single holes in the arms 29 and chosen holes 36 to maintain the arms 29, and thus the rotatable supporting member that is afforded by the ground roller 32 at a corresponding angular position about the axis defined by the pivot pins 30. The level of the axis of rotation of the roller 32 relative to that of the frame portion 1 is thus determined and it will be realised from FIG. 2, in particular, of the drawings that this level is a principal factor in dictating the depth of penetration of the tines 13 into the ground which is possible. A coupling member or trestle 38 of generally triangular configuration is mounted at the front of the frame portion 1 with respect to the direction A midway across the width of that frame portion. The coupling member or trestle 38 is constructed and arranged to enable the rotary harrow to be connected to the three-point lifting device or hitch at the rear of an agricultural tractor or other operating vehicle in the generally known manner that is illustrated in outline in FIGS. 1 and 2 of the drawings. Strengthening tie beams 39 extend from near the apex of the generally triangular coupling member or trestle 38 to anchorages at the top and rear of the frame portion 1 with respect to the direction A, said tie beams 39 being disposed in both downwardly and rearwardly divergent relationship with respect to that direction so that said anchorages are well spaced apart from one another at the back of the frame portion 1.

In the use of the rotary harrow that has been described, its coupling member or trestle 38 is connected to the three-point lifting device or hitch at the rear of an agricultural tractor or other operating vehicle and the rotary input shaft 21 of the gear box 19 is placed in driven connection with the power take-off shaft of the same tractor or other vehicle by way of the known telescopic transmission shaft 22 that has universal joints at its opposite ends. The maximum depth of penetration of the tines 13 into the ground is set by positioning the arms 29 appropriately with respect to the plates 28 employing the bolts 37 or equivalent locking pins. The speed of rotation of the shafts 2 and soil working or cultivating members 14 in response to a substantially constant input speed of rotation applied to the shaft 21 is set by an appropriate selection and arrangement of toothed pinions in the change-speed gear 20. These adjustments are made having regard to the nature and condition of the soil that is to be worked, to the prevailing weather conditions and to the soil consistency that it is desired should be produced by the harrowing or cultivating operation. As the harrow moves over the ground in the direction A, the shafts 2 all rotate in the directions that are indicated by the small arrows in FIG. 1 of the drawings which directions are such that all of the shafts 2 of the leading row revolve in one direction while all of the shafts 2 of the rear row revolve in the opposite direction. The active or soil working portion 16 of each tine 13 is spaced at a distance of substantially 15 cms. from the corresponding axis of rotation a so that each member 14 works a strip of land having a width of substantially 30 cms. with the result that the twelve strips of land that correspond to the individual members 14 overlap one another to produce, in effect, a single broad strip of worked soil. FIG. 1 of the drawings shows that all of the tines 13 that correspond to the leading row of shafts 2 occupy the same dispositions with respect to the corresponding axes a and that the same is true of all of the tines 13 that correspond to the rear row of shafts 2 although the "leading" dispositions are different to the "rear" dispositions. As seen in FIG. 1 of the drawings, all of the tines 13 that correspond to the leading row are orientated towards one side of the harrow while all of the tines 13 that correspond to the rear row are orientated towards the opposite side of the harrow. Consideration of the arrangement will show that the torque which one row of tines 13 will effect upon the frame portion 1 in one direction because of the penetration of those tines 13 into the soil surface will be substantially cancelled out by the opposite torque produced by the tines 13 of the other row and that this relationship will remain true throughout the rotation of each shaft 2 through 360° about its axis a. The employment of soil working or cultivating members 14 with single tines 13 and the arrangement thereof in two separate rows therefore has very little tendency indeed to increase the vibration which takes place during operation as compared with, for example, rotary harrows whose soil working or cultivating members are arranged in a single straight row, each of them having a pair of substantially diametrically opposed tines.

The employment of a single tine 13 per member 14 has the advantage that even quite large stones and other hard obstacles in the soil can pass between the tines 13 without becoming jammed so that little damage is likely from this cause. The rotary harrow operates with substantially no more noise than does a harrow of equivalent size constructed in accordance with the known arrangement that has just been discussed because of the fore and aft staggered arrangement of the two rows of members 14 and the fact that the lateral force produced by one straight row of tines 13 is constantly balanced by that produced by the other straight row thereof as a result of the described and illustrated arrangement of the tines. In addition to shielding persons and property at the sides of the harrow from sharp stones and the like flung laterally of its path of travel by the tines 13, the plates 25 co-operate with the immediately neighboring members 14 to ensure that their tines 13 produce substantially the same degree of crumbling of the soil at the sides of the broad strip of worked land as is brought about centrally of that strip. Thus, no significant ridging takes place at the margins of the broad strip of worked soil. In addition to its supporting function, the ground roller 32 at the rear of the harrow effects a secondary working of the soil that has been displaced by the immediately foregoing tines 13. In particular, the roller 32 crumbles any large lumps of unbroken soil that may have been turned up by the tines 13 and produces a gentle but sufficient flattening action to ensure that, where the necessary adjustments have been made to that end, a single pass of the harrow will produce a soil consistency that is suitable for employment as a seed bed. It will be noted that the fastening portion 12 of each tine 13 is located in the immediate proximity of the corresponding axis of rotation *a*, its longitudinal axis *h* intersecting that axis *a* at an acute angle whose sides open downwardly from the point of intersection. This arrangement reduces the danger of damage to the fastening portions of the tines 12 from stones and other sharp objects that may be met in the soil during a harrowing or other cultivating operation.

Although various features of the soil cultivating implement that has been described, and that are illustrated in the accompanying drawings, will be set forth in the following claims as inventive features, it is emphasised that the invention is not necessarily limited to those features and that it includes within its scope each of the parts of the soil cultivating implement that has been described and/or that is illustrated in the accompanying drawings both individually and in various combinations.

What I claim is:

1. A rotary harrow comprising a frame and a plurality of soil-working members being supported on a portion of said frame, said members being rotatable about substantially vertical axes of rotation defined by respective shafts journalled in said portion, said members being positioned to work overlapping strips of soil during operation, each of said members comprising a single downwardly extending tine that has a lower active portion spaced from its corresponding axis of rotation, driving means engaging and rotating said soil-working members about their axes and said shafts being arranged at the corners of a figurative zig-zag line that extends transverse to the normal direction of harrow travel when the harrow is viewed in plan, said shafts being positioned in two substantially straight rows, including a leading row and a rear row, the axes of rotation of the members in each row being spaced apart by substantially regular distances and said rows extending transverse to the direction of travel, an imaginary straight line interconnecting the axes of rotation of those members of the leading row being substantially parallel to a second straight line interconnecting the axes of rotation of those members of the rear row, and the distance between the two imaginary lines being substantially the same as the distance between the axes of rotation of immediately neighboring members in either of said two rows, the tines of the members of the leading row being orientated in one direction and along said imaginary straight line that interconnects the axes of rotation of those members when the tines of the rear row are orientated in an opposite direction and along said second imaginary straight line that interconnects the axes of rotation of the members of said rear row.

2. An implement as claimed in claim 1, wherein straight limbs of said zig-zag line are inclined at angles of substantially 45° to the direction of travel.

3. An implement as claimed in claim 2, wherein the tines of immediately neighbouring members are positioned to work overlapping strips of soil.

4. An implement as claimed in claim 1, wherein each tine has a fastening portion which extends adjacent the axis of rotation of the corresponding soil working member.

5. An implement as claimed in claim 4, wherein the longitudinal axis of the fastening portion of each tine intersects its corresponding axis of rotation at an acute angle, the sides of that angle opening downwardly towards the ground.

6. An implement as claimed in claim 5, wherein each tine has an active soil working portion which tapers towards a lower tip.

7. An implement as claimed in claim 6, wherein an initial upper part of said active portion is in substantially rectilinear alignment with the corresponding fastening portion, said initial part being connected by a bend to a downwardly extending substantially straight part.

8. An implement as claimed in claim 7, wherein the downwardly extending substantially straight part of said active portion of each tine is in substantially parallel relationship with the axis of rotation of the corresponding soil working member.

9. A rotary harrow comprising a frame and a plurality of soil-working members being supported on a portion of said frame, said members being rotatable about substantially vertical axes of rotation defined by respective shafts journalled in said portion, said members being positioned to work overlapping strips of soil during operation, each of said members comprising a single downwardly extending tine that has a lower active portion spaced from its corresponding axis of rotation, driving means engaging and rotating said soil-working members about their axes and said shafts being arranged at the corners of a figurative zig-zag line that extends transverse to the normal direction of harrow travel when the harrow is viewed in plan, said shafts being positioned in two substantially straight rows, including a leading row and a rear row, the axes of rotation of the members in each row being spaced apart by substantially regular distances, said driving means including a transmission housed in said frame portion and said transmission being connected to rotate the soil-working members of the leading row in relative opposite directions with respect to the members of said rear row, the tines of the members of the leading row being orientated in one direction and along an imaginary straight line that interconnects the axes of rotation of those members when the tines of the rear row are orientated in an opposite direction and along a second imaginary straight line that interconnects the axes of rotation of the members of said rear row.

10. An implement as claimed in claim 9, wherein the distance between the two imaginary lines is substantially the same as is the substantially regular distance between the axes of immediately neighbouring members of either one of those rows.

11. An implement as claimed in claim 9 wherein, said tines have fastening portions and the portions of said members in one row extend substantially perpendicular to the direction of travel from their corresponding axes of rotation, the fastening portions of the tines of the members of the other straight row all extending in substantially diametrically opposite directions from their corresponding axes of rotation.

12. An implement as claimed in claim 11, wherein, when the implement is viewed from the rear at that instant, the tines of the soil working members of a leading row of those members are located to the left of their corresponding axes of rotation and the tines of the members of a rear row are located to the right of their corresponding axes of rotation.

* * * * *